Oct. 10, 1933.  J. M. HOTHERSALL  1,929,430

CONTAINER

Filed June 25, 1930

INVENTOR
John M. Hothersall
BY
John C. Carpenter
ATTORNEY

Patented Oct. 10, 1933

1,929,430

UNITED STATES PATENT OFFICE 1,929,430

CONTAINER

John M. Hothersall, Brooklyn, N. Y., assignor to American Can Company, New York, N. Y., a corporation of New Jersey Application June 25, 1930. Serial No. 463,713

3 Claims. (Cl. 220—94)

The present invention relates to a container and has particular reference to such a container embodying an improved type of handle.

The principal object of the present invention is the provision of a container provided with an improved type of handle which is applied thereto after the container is closed.

An important object of the invention is the provision of an improved type of handle for engagement with the seam between a container and the top end closure.

An important object of the invention is the provision of an improved handle provided with engaging parts for engagement with the seam of a container and engaging beneath the seam to support the weight of the container and contents when carried by the handle.

An important object of the present invention is the provision of an improved type of handle having ends easily attached to the container and having abutments engaging beneath parts of the container to provide supporting surfaces therefor.

A further important object of the invention is the provision of an improved type of handle having ends secured to the seam of a container, these ends being slotted to permit partial engagement of the ends beneath the seam when the handle is secured in position.

Numerous other objects of the invention will be apparent as it is better understood from the following description, which, taken in connection with the accompanying drawing, discloses a preferred embodiment thereof.

Referring to the drawing:—

Figure 2:
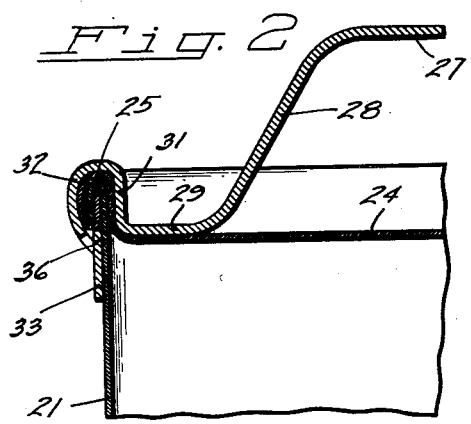
Fig. 2 is an enlarged sectional detail taken substantially along the line 2—2 in Fig. 1.
Figure 3:
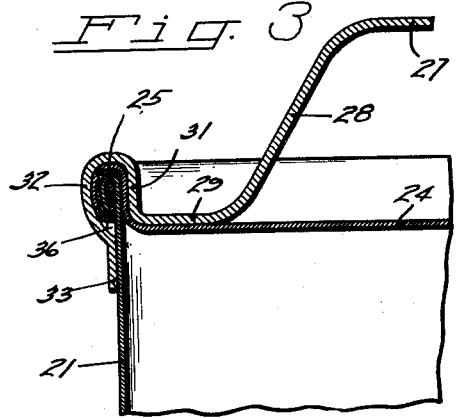
Fig. 3 is a view similar to Fig. 2 being taken substantially along the line 3—3 in Fig. 1.

The present invention, as exemplified in the drawing, embodies a container body 21 provided with a bottom 22 secured thereto in a seam 23. The body 21 is also provided with an upper end 24 secured thereto in a seam 25. The seam 25 projects beyond the wall of the body 21 and may be of the double seam type, as illustrated in detail in Figs. 2 and 3.

A flat metal handle 26 is formed with a handle grip section 27 and inclined portions 28 extending into the two ends of the handle, which are adapted for engagement with the seam 25 of the container. The portions 28 of the handle extend into horizontal sections 29, each section connecting with a vertical wall 31 which engages inside of the top end seam of the container, this wall connecting with an outer wall 32 passing on the outside of the seam, the walls 31 and 32 tightly clamping the seam therebetween.

Figure 1:
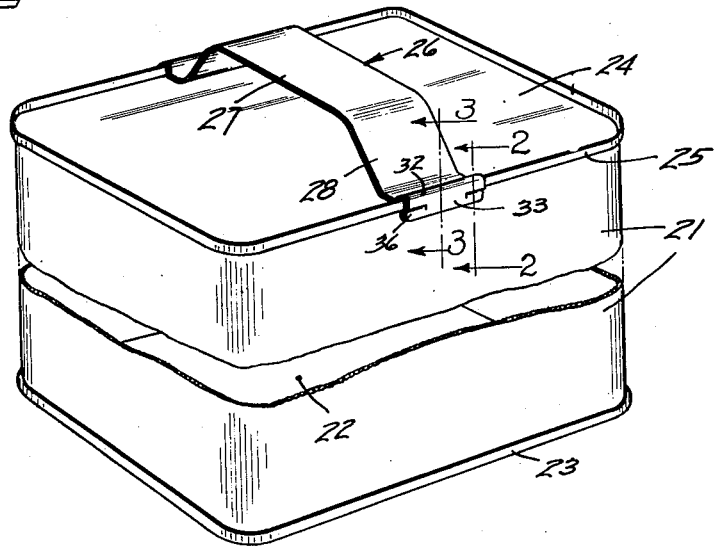
Figure 1 is a perspective view of an improved container of the present invention which is provided with an improved type of handle.
Figure 4:
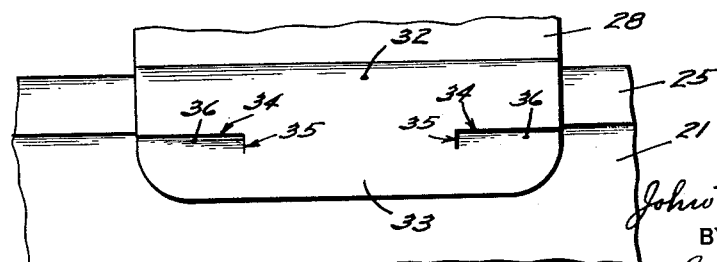
Fig. 4 is an enlarged fragmentary detail of the face of one end of the handle and parts of the container adjacent.

Each outer wall 32 is extended downwardly into a terminal section 33 which is provided with horizontal slits 34 and short vertical slits or slots 35 cut through the metal on opposite edges of the handle, as illustrated in Figs. 1 and 4. The terminal section 33 engages the outer wall of the container body 21 and the slots permit bending of a portion of this wall inwardly to provide abutments 36 (Fig. 2) engaging directly beneath the extended seam 25. The central unslotted part of the section 33 passes from over the seam into close engagement with the body wall 21.

This type of handle may be easily secured to the container and the walls 31 and 32 thereof tightly clamp the seam portion to the handle while the abutments 36 provide supporting shoulders for engagement with the projecting seam 25. This provides an improved holding connection of the handle on the container and permits lifting of the weight of the container and contents without fear of loosening the handle, this weight resting positively upon the abutments 36 as the container is lifted by the handle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container comprising a body, an end member secured to said body in a projecting seam, and a flat metal handle secured to said container, said handle having its ends embracing the outer side of said projecting seam, each end terminating in a slotted section having edge parts thereof pressed inwardly against the wall of said body to provide abutments which engage beneath said seam and support the weight of the container and contents when it is carried by said handle.

2. A container comprising a body, an end member having a depressed central portion secured to said body in a projecting double seam, and a flat metal handle located in the depression of said end member and having a central hand grip section and two end sections the latter embracing the outer side of said projecting seam and terminating in slotted sections, parts of which are pressed inwardly adjacent the body wall to provide abutments which engage beneath said seam and support the weight of the container and contents when it is carried by said handle.

3. The combination of a container having a double seam at its end, and a handle of sheet metal, the end portions of said handle being formed with vertical slits, parts at the sides of said slits being bent inward to fit under and engage up against the under side of the said double seam, and other parts at the sides of said slits being bent up at the outer side of the double seam and over and downward on the inner side of the seam and thence extending inward and merging into each other and forming the holding part of the handle.

JOHN M. HOTHERSALL.